(12) United States Patent
Gates (10) Patent No.: US 9,668,399 B2
(45) Date of Patent: Jun. 6, 2017

(54) DYNAMICALLY ADAPTIVE SOIL CONDITIONING SYSTEM

(71) Applicant: M. Gates Manufacturing, Inc., Lansford, ND (US)

(72) Inventor: Andrew R Gates, Fargo, ND (US)

(73) Assignee: Andrew R. Gates, Fargo, ND (US)

( * ) Notice: Subject to any disclaimer, the term of this patent is extended or adjusted under 35 U.S.C. 154(b) by 98 days.

(21) Appl. No.: 14/643,934

(22) Filed: Mar. 10, 2015

(65) Prior Publication Data
US 2016/0262300 A1 Sep. 15, 2016

(51) Int. Cl.
| | | |
|---|---|---|
| A01B 63/24 | (2006.01) |
| A01B 63/00 | (2006.01) |
| A01B 79/00 | (2006.01) |
| A01B 21/08 | (2006.01) |

(52) U.S. Cl.
CPC .......... *A01B 63/245* (2013.01); *A01B 63/004* (2013.01); *A01B 79/005* (2013.01); *A01B 21/08* (2013.01)

(58) Field of Classification Search
CPC .................................. A01B 5/04; A01B 63/24
USPC ... 172/7, 568, 569, 579, 580, 599, 600, 603, 172/663, 667
See application file for complete search history.

(56) References Cited

U.S. PATENT DOCUMENTS

| | | | |
|---|---|---|---|
| 3,845,825 A | 11/1974 | Boone et al. | |
| 5,462,123 A * | 10/1995 | Harlan | A01B 63/32 172/454 |
| 5,915,481 A | 6/1999 | Flenker et al. | |
| 6,612,381 B2 | 9/2003 | Powell et al. | |
| 7,000,708 B2 | 2/2006 | Powell et al. | |
| 7,108,075 B2 | 9/2006 | Powell et al. | |
| 7,373,231 B2 | 5/2008 | McClure et al. | |
| 7,460,942 B2 | 12/2008 | Mailer | |
| 7,762,345 B2 | 7/2010 | Rozendaal et al. | |
| 8,113,295 B2 | 2/2012 | Rozendaal et al. | |
| 8,196,672 B2 | 6/2012 | Rozendaal et al. | |
| 8,307,908 B2 | 11/2012 | Rozendaal et al. | |
| 8,307,909 B1 | 11/2012 | Rozendaal et al. | |
| 8,534,374 B2 | 9/2013 | Hake et al. | |

(Continued)

FOREIGN PATENT DOCUMENTS

EP 2385266 B1 5/2013

*Primary Examiner* — Gary Hartmann
(74) *Attorney, Agent, or Firm* — Craige Thompson; Thompson Patent Law (57) ABSTRACT

Apparatus and associated methods for a coulter disk system relate to a lateral actuator module having a programmably positionable control member that is coupled to a gang of coulter disks and is operable to position a control point of the coulter disks at a predetermined position between two opposing, laterally-spaced end-of-travel positions. In an exemplary embodiment, a gang may be mechanically connected to and laterally positioned by the control point. The predetermined position may be, in some examples, dynamically calculated according to a predetermined function and based on information about conditions of the soil in contact with the coulter disks. Various embodiments may dynamically adjust the position of a gang of coulter disks to dynamically and automatically optimize the conditioning effectiveness of the gang of coulter disks in response to parametric information about the soil conditions.

20 Claims, 9 Drawing Sheets

(56) References Cited

U.S. PATENT DOCUMENTS

| | | |
|---|---|---|
| 8,558,157 B2 | 10/2013 | Holland |
| 8,626,408 B1 | 1/2014 | Satzler et al. |
| 8,738,244 B2 | 5/2014 | Lenz et al. |
| 8,746,361 B2 * | 6/2014 | Hake ............... A01B 21/08 172/581 |
| 8,843,269 B2 | 9/2014 | Anderson et al. |
| 8,985,232 B2 * | 3/2015 | Bassett ............ A01C 7/205 111/135 |
| 2006/0124327 A1 * | 6/2006 | Powell ............. A01B 23/046 172/600 |
| 2008/0195268 A1 | 8/2008 | Sapilewski et al. |
| 2008/0230243 A1 * | 9/2008 | Evin ............... A01B 21/086 172/569 |
| 2014/0000919 A1 * | 1/2014 | Bachman .......... A01B 73/044 172/1 |
| 2014/0262363 A1 | 9/2014 | Gray et al. |
| 2015/0163988 A1 * | 6/2015 | Swanson .......... A01B 33/024 172/569 |
| 2016/0029547 A1 * | 2/2016 | Casper ............ A01B 63/002 701/50 |

* cited by examiner

FIG. 7

DYNAMICALLY ADAPTIVE SOIL CONDITIONING SYSTEM

TECHNICAL FIELD

Various embodiments relate generally to agricultural or related processes, such as, for example, to condition soil.

BACKGROUND

A wide array of food products available in grocery stores originate from farm fields. A single farm field can include acres of soil in which selected crops can be planted and harvested.

To harvest a crop, a farm worker may employ manual tools to retrieve the desirable portions of each plant. However, modern farms may employ self-propelled vehicles, such as tractors, to multiply how fast each worker can retrieve those desirable portions of the plants. Tractors can, for example, transport implements through the field to automate the retrieval process. Whether manual or vehicular tools are used, sometimes vegetative residue remains in the field after the desirable portions have been retrieved and sent for processing into food stuffs suitable for consumption by the public.

After a harvest but before a subsequent planting, the soil in the field may be conditioned by farm workers. Soil conditioning may mitigate, for example, soil erosion, or till any vegetative residue remaining from the previous harvest. Soil conditioning tools include coulter disks and finishing baskets, for example.

SUMMARY

Apparatus and associated methods for a coulter disk system relate to a lateral actuator module having a programmably positionable control member that is coupled to a gang of coulter disks and is operable to position a control point of the coulter disks at a predetermined position between two opposing, laterally-spaced end-of-travel positions. In an exemplary embodiment, a gang may be mechanically connected to and laterally positioned by the control point. The predetermined position may be, in some examples, dynamically calculated according to a predetermined function and based on information about conditions of the soil in contact with the coulter disks. Various embodiments may dynamically adjust the position of a gang of coulter disks to dynamically and automatically optimize the conditioning effectiveness of the gang of coulter disks in response to parametric information about the soil conditions.

Various embodiments may achieve one or more advantages. For example, some embodiments may substantially reduce or eliminate the need for a farm worker to manually adjust orientations or positions of the coulter disks in order, for example, to optimize the soil conditioning according to local soil conditions. In some implementations, the automatic adjustment may substantially increase efficiency and productivity of the farm worker and the soil condition process. For example, various embodiments may substantially reduce or minimize the number of passes required to properly condition the soil. Some embodiments may render adjustment or use of multiple different-sized coulter disk systems in order to condition a field that has multiple regions of substantially different conditions. For example, when a worker is conditioning a field in a region having rocky soil, some embodiments may automatically reduce or neutralize a yaw angle of a gang of coulter disks while in that rocky region, and then automatically increase the yaw angle of that gang as the tractor pulls the coulter disk system to a less rocky region of the field. Such automated response may, for example, advantageously reduce wear on the coulter disks, which may improve their service life and reduce maintenance and breakage. Accordingly, various embodiments may further adjust a relative spacing between nearest adjacent rows of coulter disks among longitudinally separated gangs, for example, in response to information about a moisture level of the soil. Based on predetermined and/or near-real time sensed soil condition information about the soil at various locations throughout the field, substantially precise adjustments to position the coulter disks to optimize the conditioning effectiveness may be achieved in some embodiments. In various implementations, enhanced soil conditioning effectiveness across the various soil conditions in a field may promote substantially improved yields from a subsequent crop harvest, which may result, for example, from reduced erosion, improved tilling, and/or improved handling of vegetative residue.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
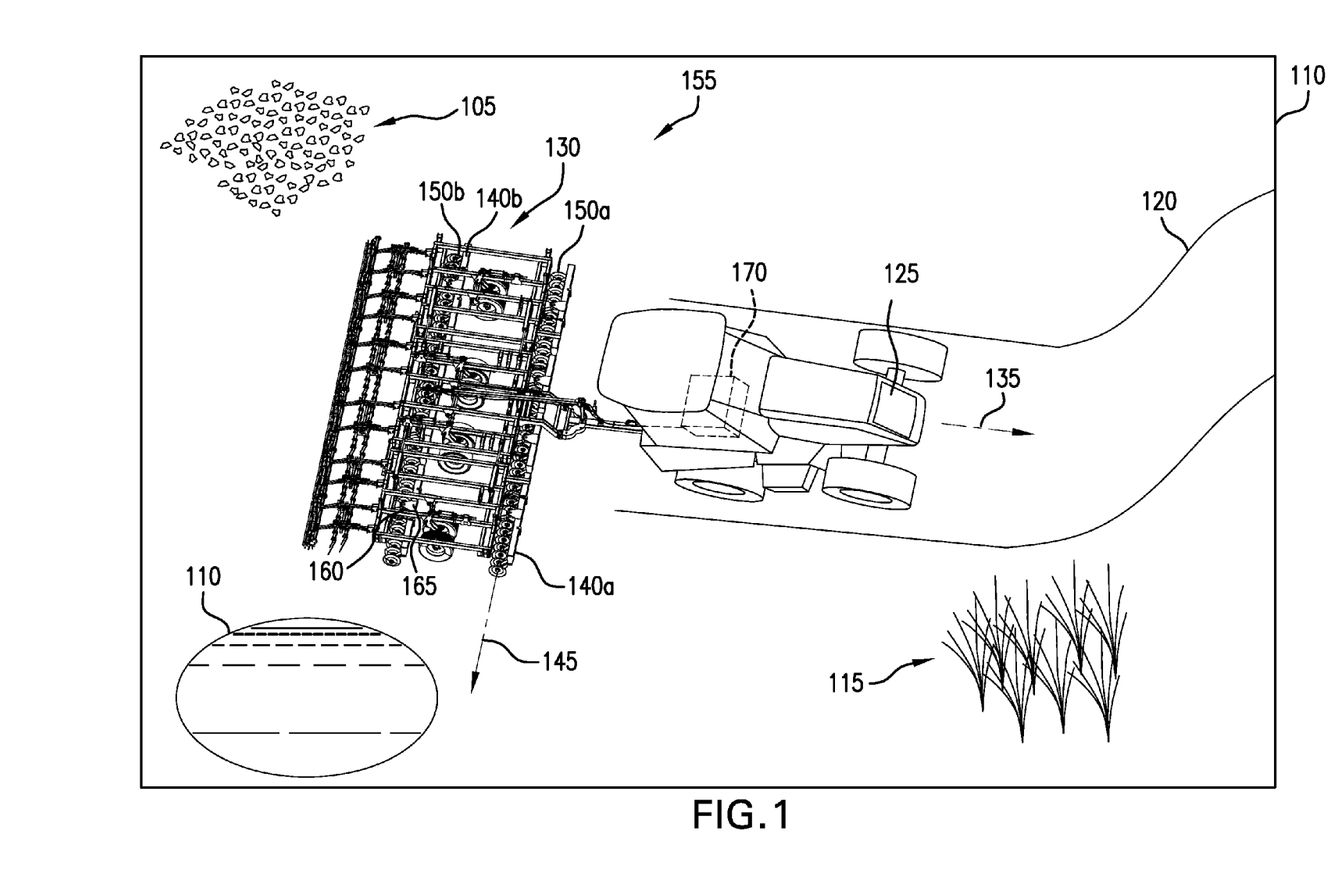
FIG. 1 depicts an exemplary dynamic adaptive soil conditioning system (DASCS) to control lateral-spacing between longitudinally-spaced gangs of soil conditioning implements according to a predetermined function of sensed parameters.

FIG. 1 depicts an exemplary dynamic adaptive soil conditioning system (DASCS) to control lateral-spacing between longitudinally-spaced gangs of soil conditioning implements according to a predetermined function of sensed parameters. A field 100 has areas with various soil conditions, including a rocky surface 105, a wet surface 110, a surface with a high level of residue coverage 115, and an inclined surface 120. In the field, a tractor 125 pulls a soil conditioning apparatus (SCA 130) in a forward direction of travel along a longitudinal axis 135 that runs substantially parallel to an axis that runs center mass from the front of the tractor 125 to the rear of the tractor 125 to condition the soil, for example, to improve agricultural yield. In the depicted embodiment, the SCA 130 includes a front gang 140a and a rear gang 140b, each including a mechanically connected gang header that extends substantially laterally relative to the forward direction of travel (not shown). The gangs 140a-140b run along a lateral axis 145 that is substantially perpendicular to the longitudinal axis 135. The gangs 140 include a plurality of coulter disks 150 laterally spaced apart from each other and supported by the gang header. The SCA 130 further includes a DASCS 155 configured to adapt how the coulter disks 150b of the rear gang 140b are positioned to address the soil based on soil condition information.

The DASCS 155 includes an actuator module 160 operatively linked to control position of the coulter disks of the rear gang 140b. The actuator module 160 includes a link member 165 that extends longitudinally rearward to the rear gang on the SCA 130. The actuator module 160 may dynamically adjust a lateral position of the link member 165 so as to laterally shift position of the rear gang 140b. Further, the DASCS 155 includes a control system 170 connected to the actuator module 160. The control system 170 receives and processes soil condition information. Based on this soil condition information, the control system 170 may generate command signals to control the actuator module 160.

In some embodiments, the control system 170 may generate appropriate command signals for adjusting the position of the rear gang 140b in order to optimize the relative lateral-spacing between the coulter disks 150a of the front gang 140a and the coulter disks 150b of the rear gang 140b. In various embodiments, the control system 170 may automatically adjust, for example, the lateral position of the rear gang 140b relative to the lateral position of the front gang 140a in response to differentiated soil conditions in the field 100. In operation, as the SCA 130 transitions from rocky surface 105 to a wet surface 110, the control system 170 may dynamically generate commands to cause the actuator module 160, for example, to laterally shift the rear gang 140b to optimize effectiveness and/or minimize wear of the SCA 130.

In some embodiments, the control system 170 may be mounted on the SCA 130 to increase mobility of the control system 170 between different tractors. The control system 170 may communicatively connect to any compatible display device, for example, a display device mounted on a tractor.

Figure 2:
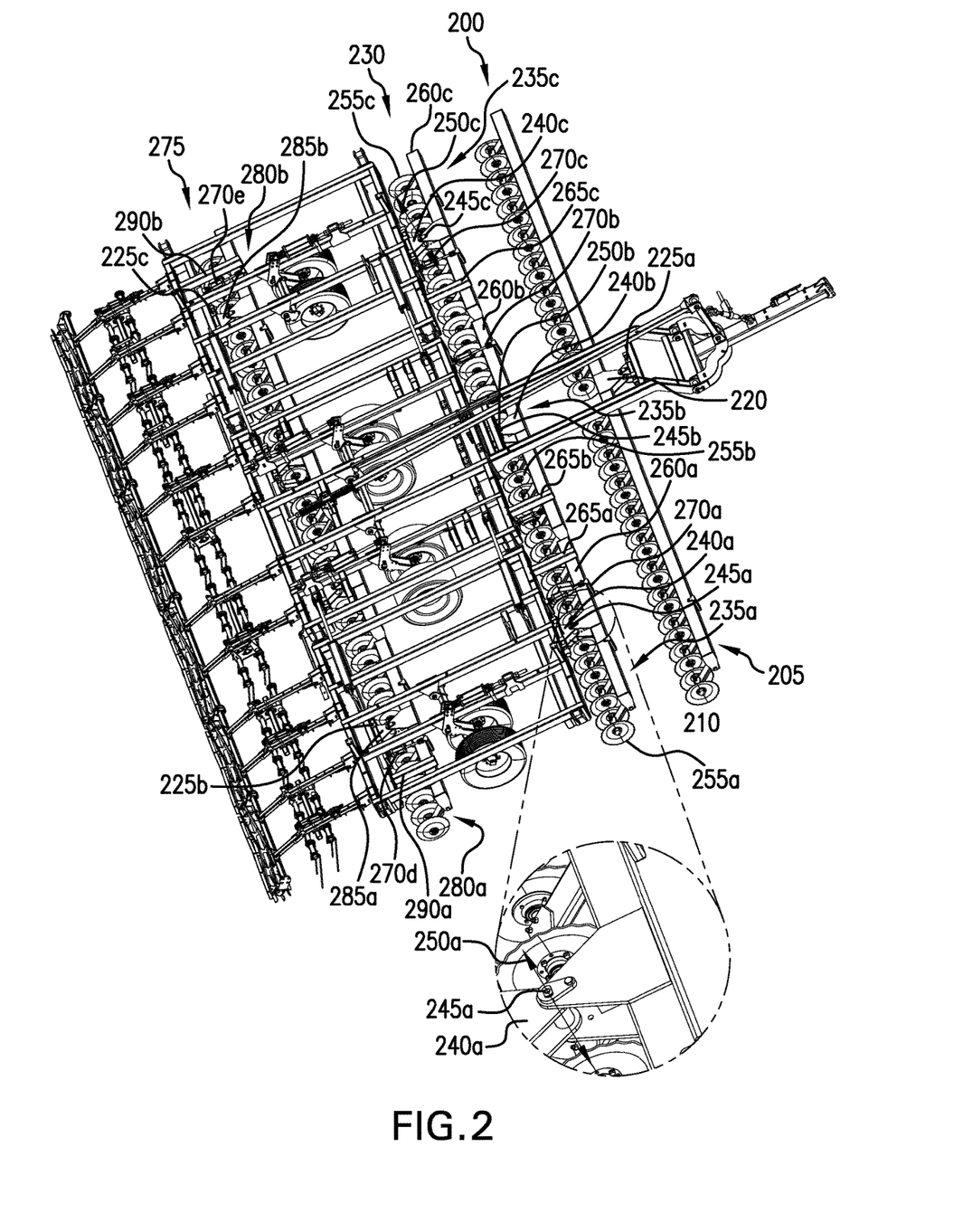
FIG. 2 depicts an exemplary Soil Conditioning Apparatus (SCA).

FIG. 2 depicts an exemplary Soil Conditioning Apparatus (SCA). As depicted, the SCA 130 contains a first row 200 with a singular gang 205 extending substantially laterally and parallel to the surface of the field 100. The gang 205 includes a plurality of coulter disks 210 laterally spaced apart from each other and supported by a gang header 215. A mount 220 affixed to the center of the gang 205 attaches the gang 205 to the SCA 130. The mount 220 includes a lateral actuator module 225a having a programmably positionable control member to shift the gang 205 along the lateral axis 145.

In the depicted embodiment, the SCA 130 includes a second row 230 of coulter disk gangs that are longitudinally-spaced from the first row 200. The second row 230 includes three individual sets of gangs 235a, 235b, 235c. In the depicted embodiment, each gang 235a-235c affixes to a respective pivot capable mount 240a, 240b, 240c with a pivot point 245a, 245b, 245c at the center of the mount 240a-240c. Vertical lines passing through each of the pivot points 245a-245c defines a corresponding yaw axis 250a, 250b, 250c. The gangs 235a-235c each include a plurality of coulter disks 255a, 255b, 255c laterally spaced apart from each other and supported by a gang headers 260a, 260b, 260c. The coulter disks of the gangs 235a-235c oriented to a plane and substantially perpendicular to the lateral axis 145. The coulter disks 255a-255c interface with the surface of the field 100 at the angle of attack defined by a yaw angle of the disk about a yaw axis. The pivot capable mounts 240a-240c attach the gangs 235a-235c to the SCA 130. A stabilizing bar 265a, 265b, 265c protrudes along the longitudinal axis 135 from the SCA 130 toward the gang 235a-235c and contacts the top of the gang headers 260a-260c. A yaw actuator module 270a, 270b, 270c mounts adjacent to and parallel to the stabilizing bar 265a-265c. The stabilizing bar 265a-265c substantially maintains the gangs 235a-235c at a controlled height above the surface of the field 100 during operation.

When the tractor 125 is pulling the SCA 130 forward along the longitudinal axis 135, the yaw actuator modules 270a-270c may adjust the gangs 235a-235c respective to the yaw axis 250a-250c to change the angle of attack. For example, in some implementations, where the field 100 surface has a high level of residue coverage 115, the DASCS 155 may control the yaw actuator modules 270a-270c, combined with the forward direction, to increase the angle of attack to optimize soil disturbance based on the surface of the field 100. In some embodiments, the DASCS 155 controls the yaw actuator modules 270a-270c to shift the gangs 235a-235c about the yaw axis 250a-250c. In response to the SCA 130 moving through different field surfaces, for example, high level of residue coverage surface 115 to low level of residue coverage surface, the DASCS 155 may vary the angle of attack based on soil conditions 105, 110, 115, 120 to optimize the cultivation of the field without time or attention of an operator of the tractor 125. In an exemplary embodiment, the yaw actuator module 270a-270c is a hydraulic actuator.

In the depicted embodiment, the SCA 130 includes a third row 275 of coulter disk gangs that are longitudinally-spaced from the first row 200. The third row 275 includes two individual sets of gangs 280a, 280b. In the depicted embodiment, each gang 280a-280b affixes to a respective pivot capable mount 285a, 285b with a pivot point at the center of the mount 285a-285b. A stabilizing bar 290a, 290b protrudes along the longitudinal axis 135 from the SCA 130 toward each respective gang 280a-280b contacting the top of the respective gang 280a-280b. Each mount 285a-285b contains a lateral actuator module 225b, 225c to shift each gang 280a-280c along the lateral axis 145. A yaw actuator module 270d 270e mounts adjacent to and parallel to each stabilizing bar 280a-280b.

The DASCS 155 may independently control each of lateral actuator modules 225a-225c and yaw actuator modules 270a-270e. For example, as the tractor 125 travels along the longitudinal axis 135 the gang 205 may remain stationary and the DASCS 155 may adjust the gangs 280a-280b along the lateral axis 145 to optimize the lateral-spacing between the disks of the gang 205 and the disks of the gangs 280a-280b based on soil condition of the field. Further, the DASCS 155 may independently control any of the yaw actuator modules 270a-270c of the second row 230 to adjust the angle of attack. In the depicted embodiment, the DASCS 155 may independently control any of the lateral actuator module 225a-225c and yaw actuators 270a-270e to cultivate the field 100 with greater precision by dynamically adjusting the lateral-spacing and/or angle of attack based on different soil conditions encountered as the tractor 125 pulls the SCA 130 across a variety of field 100 surfaces, such as surfaces 105-120.

Figure 3A:
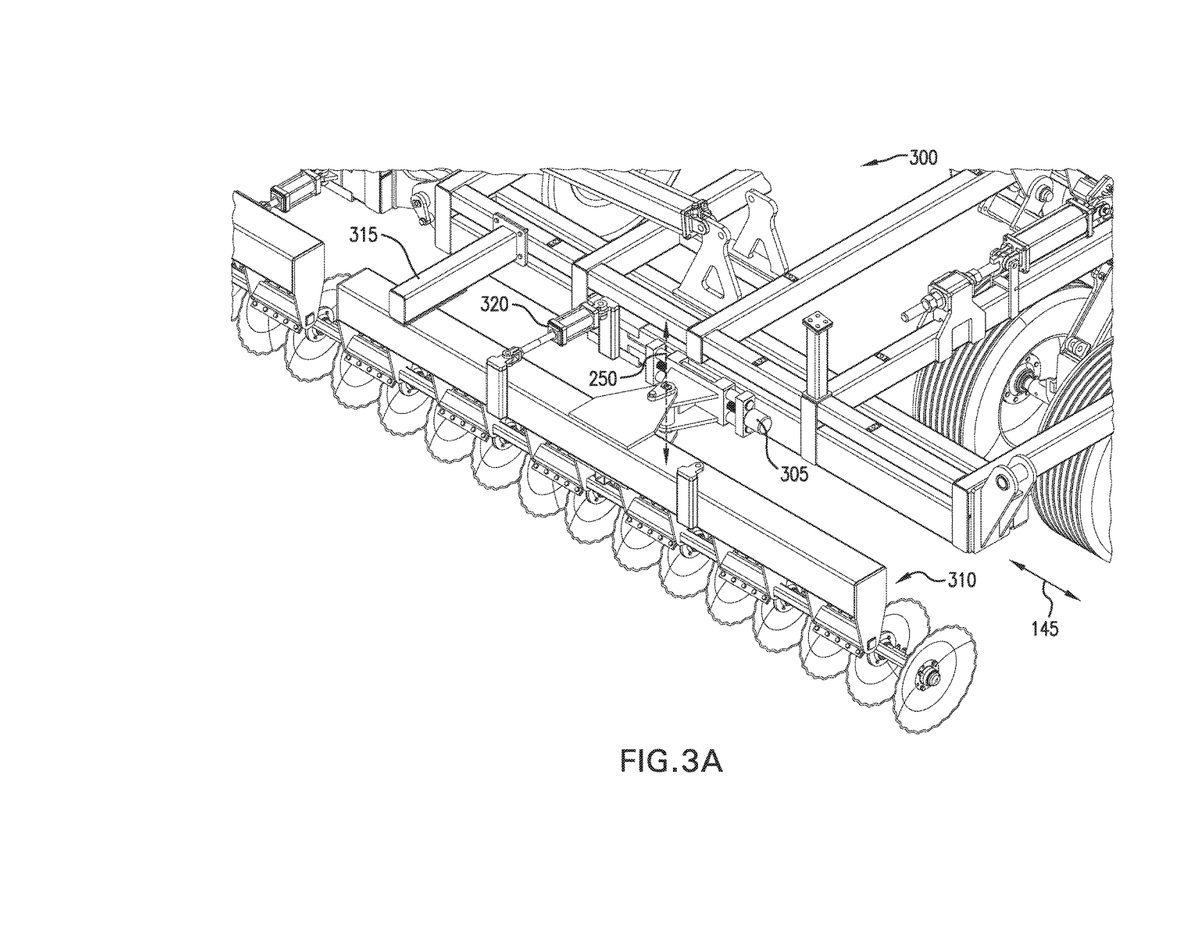
FIG. 3A depicts a section view of an exemplary neutral position with no adjustments to a gang along the lateral and yaw axes.

FIG. 3A depicts a section view of an exemplary neutral position with no adjustments to a gang along the lateral and yaw axes. In the depicted embodiment, a lateral actuator module 305 is a screw-type linear actuator mounted to the SCA 130 parallel to and opposite to the gang 310. A stabilizing bar 315 protrudes along the longitudinal axis 135 from the SCA 130 toward the gang 310 and contacts the top of the gang 310. A yaw actuator 320 module is a hydraulic actuator mounted adjacent to and parallel to the stabilizing bar 315. A replaceable low friction coefficient material 325 rests between the stabilizing bar 315 and the top of the gang 310 creating a slidable surface to enable the adjustment of the gang 310 about the yaw axis 250. In some embodiments, the low friction coefficient material 325 may be an Ultra High Molecular Weight Polyethylene material (UHMWPE). In the depicted embodiment no adjustments have been made to the lateral 145 or yaw axis 250. This neutral position 300 is favorable when cultivating a field 100 that requires minimal soil disturbance.

Figure 3B:
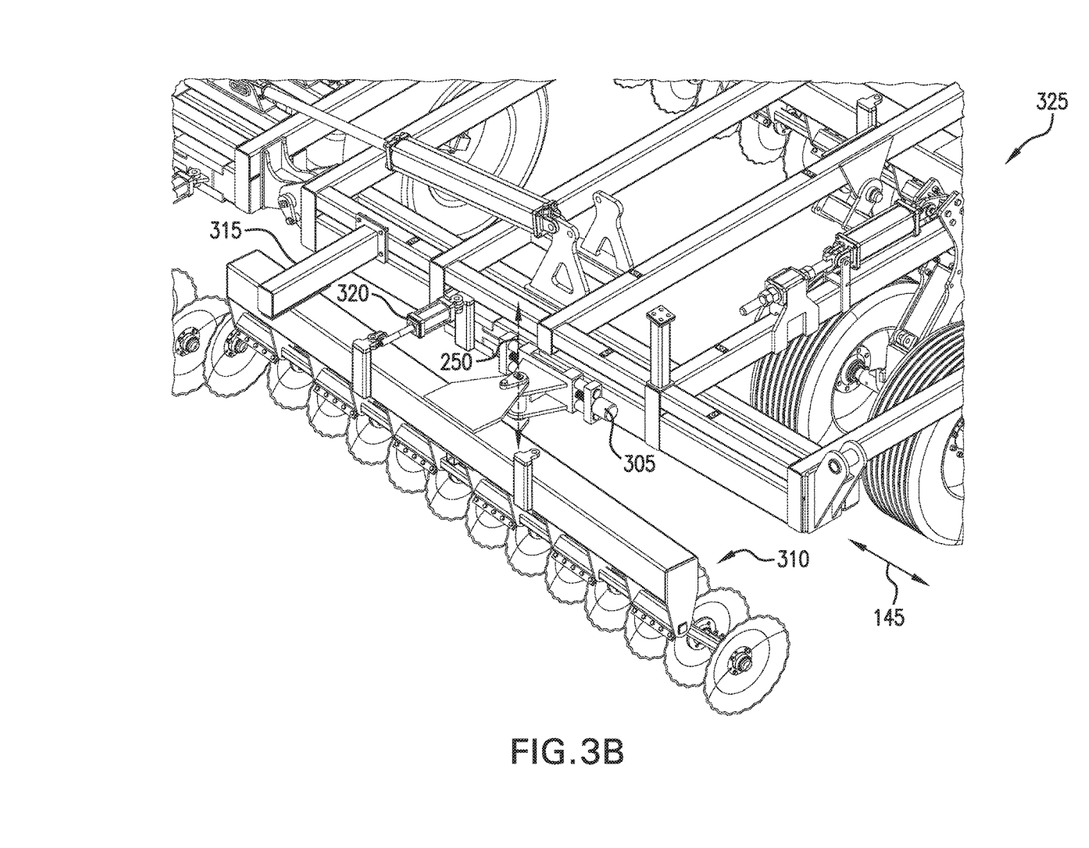
FIG. 3B depicts a section view of an exemplary intermediary position of a gang with some adjustment along the lateral and yaw axes.

FIG. 3B depicts a section view of an exemplary intermediary position of a gang with some adjustment along the lateral and yaw axes. In the depicted embodiment, the lateral actuator module 305 adjusts the gang 310 three inches left from the neutral position to an intermediary position. The yaw actuator module 345 adjusts the gang 310 seven degrees about the yaw axis 250. In the depicted embodiment, the lateral shift adjustments causes a lateral offset from the neutral position 300 to the left. The yaw shift (along with the forward direction of travel along the longitudinal axis) causes the angle of attack to increase seven degrees substantially relative to the lateral axis 145. This intermediary position 325 allows for a moderate amount of soil disturbance.

Figure 3C:
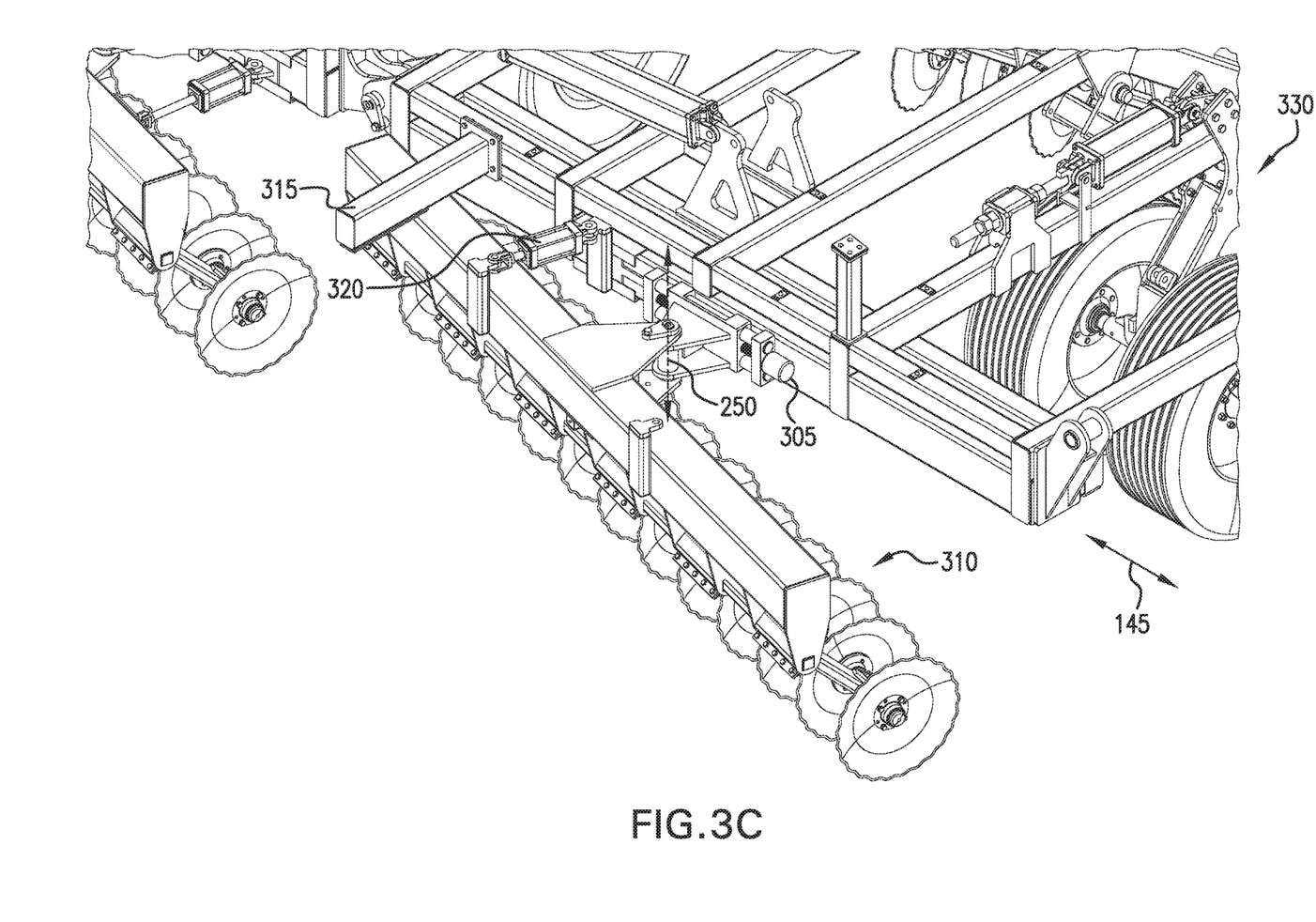
FIG. 3C depicts an exemplary section view of a gang with extreme adjustments along the lateral and yaw axes.

FIG. 3C depicts an exemplary section view of a gang with extreme adjustments along the lateral and yaw axes. In the depicted embodiment, the lateral actuator module 305 adjusts the gang 310 six inches right from the neutral position to an extreme position. The yaw actuator module 320 adjusts the gang 310 fifteen degrees about the yaw axis 250. In the depicted embodiment, the lateral shift adjustments causes a maximum lateral offset from the neutral position 300 to the right. The yaw shift (along with the forward direction of travel along the longitudinal axis) adjusts the angle of attack substantially fifteen degrees relative to the lateral axis. This extreme adjustment position allows for high amount of soil disturbance to optimize the cultivation of a field with a high level of residue coverage 115.

The DASCS 155 may adjust to any of the three positions 300, 325, 330. In an exemplary embodiment, the DASCS 155 adjusts to any range of possible positions from the neutral position 300 and the extreme positions 330 in response to soil condition information. Where multiple rows of gangs 205, 235a-235c, 280a-280b reside on the SCA 130 as depicted in FIG. 2, the DASCS 155 may control each set of gangs 205, 235a-235c, 280a-280b in any row 200, 230, 275 to adjust to any position with respect to lateral-spacing and angle of attack for optimizing the cultivation of the field 100.

Figure 4:
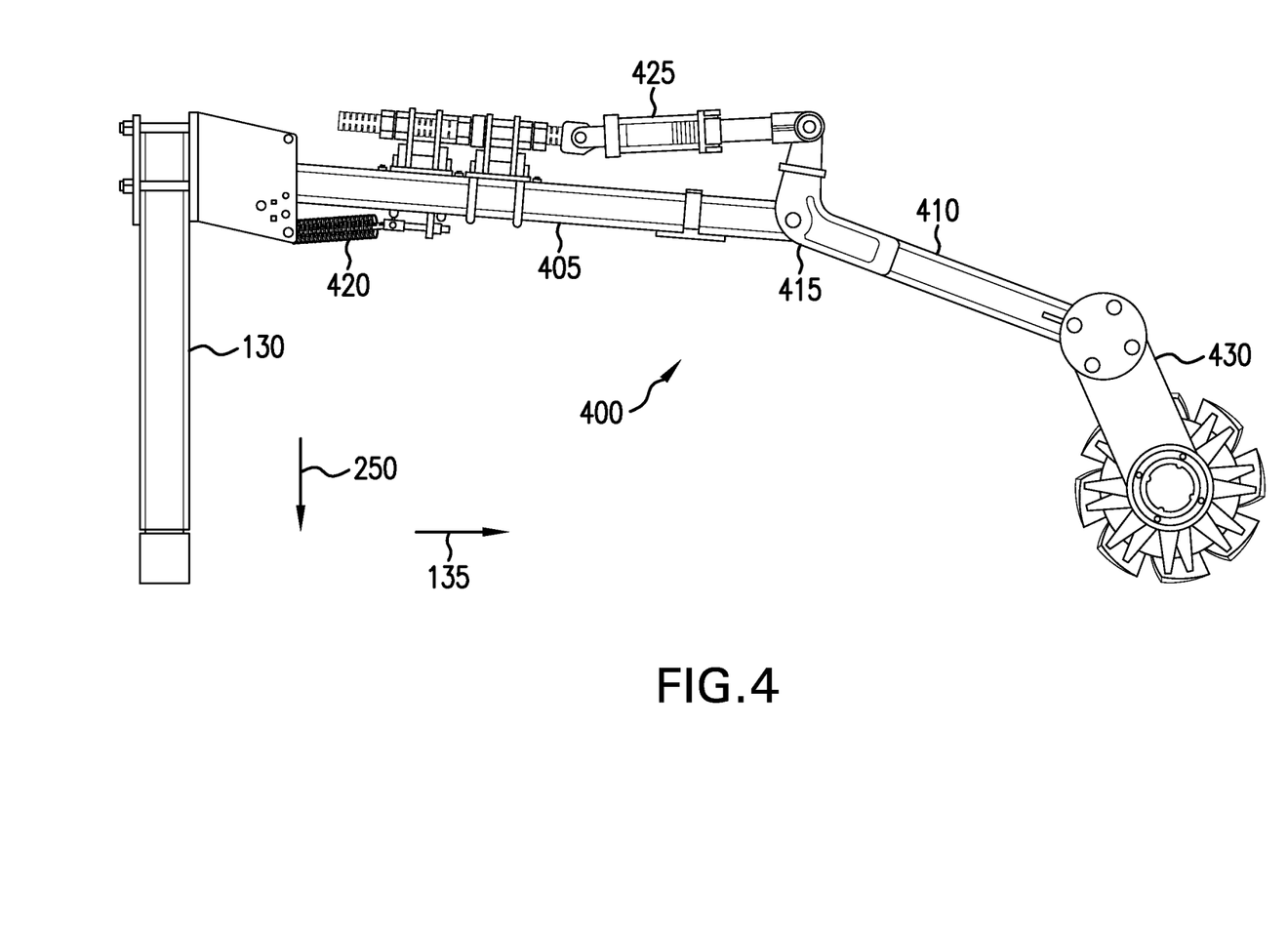
FIG. 4 is a side view of a mounting arm and a finishing attachment with an exemplary lift actuator module.

FIG. 4 is a side view of a mounting arm and a finishing attachment with an exemplary lift actuator module. A mounting arm 400 may be pivotally mounted and in a trailing relationship to the SCA 130. The mounting arm includes a front member 405 pivotably coupled to a back member 410 at an elbow joint 415. The rear member 410 extends from the elbow joint 415 at a slightly increased angle from the angle between the front member 405 and the SCA 130. A lift actuator module 425 mounts on top of the mounting arm 405 oriented along the longitudinal axis 135. A finishing attachment 430 releasably couples to the second member 410 of the mounting arm 400. In response to commands from the control system module 170, the lift actuator 425 may retract along the longitudinal axis 135, thereby modulating a lift of the finishing attachment 430 off the ground. For example, in response to a surface of the field 100 with lighter soils, the DASCS 155 may command the lift actuator module 425 to modulate a lift of the finishing attachment 430 to optimize soil cultivation. As the tractor 125 and SCA 130 move across the field with varying surfaces 100, control of the lift actuator module 420 may dynamically modulate the lift of the finishing attachment 420 without involvement of the operator.

In the depicted embodiment, a bias spring 420 further attaches the mounting arm 400 to the SCA 130 so as to oppose upward rotation of the front member 405 about the pivot point coupling to the SCA 130.

In the depicted embodiment, the mounting arm 400 is bolted to the SCA 130. In some embodiments, the mounting arms 400 may be welded. In the depicted embodiment, the lift actuator module 425 is a hydraulic actuator. In some embodiments, the lift actuator module 415 may be a transmission actuator.

In the depicted embodiment, the finishing attachment 430 is a rolling basket. In some embodiments, a multiplicity of mounting arms may be pivotably mounted and in a trailing relationship to the SCA 130 to accommodate a multiplicity of finishing attachments, for example, a rolling basket and a rubber tire packer. The multiplicity of mounting arms may each include a lift actuator. In one example, in response to a parameter sensor data measuring the level of soil compaction, the DASCS 155 may dynamically and independently command each lift actuator to modulate a different lift for each finishing attachment.

Figure 5:
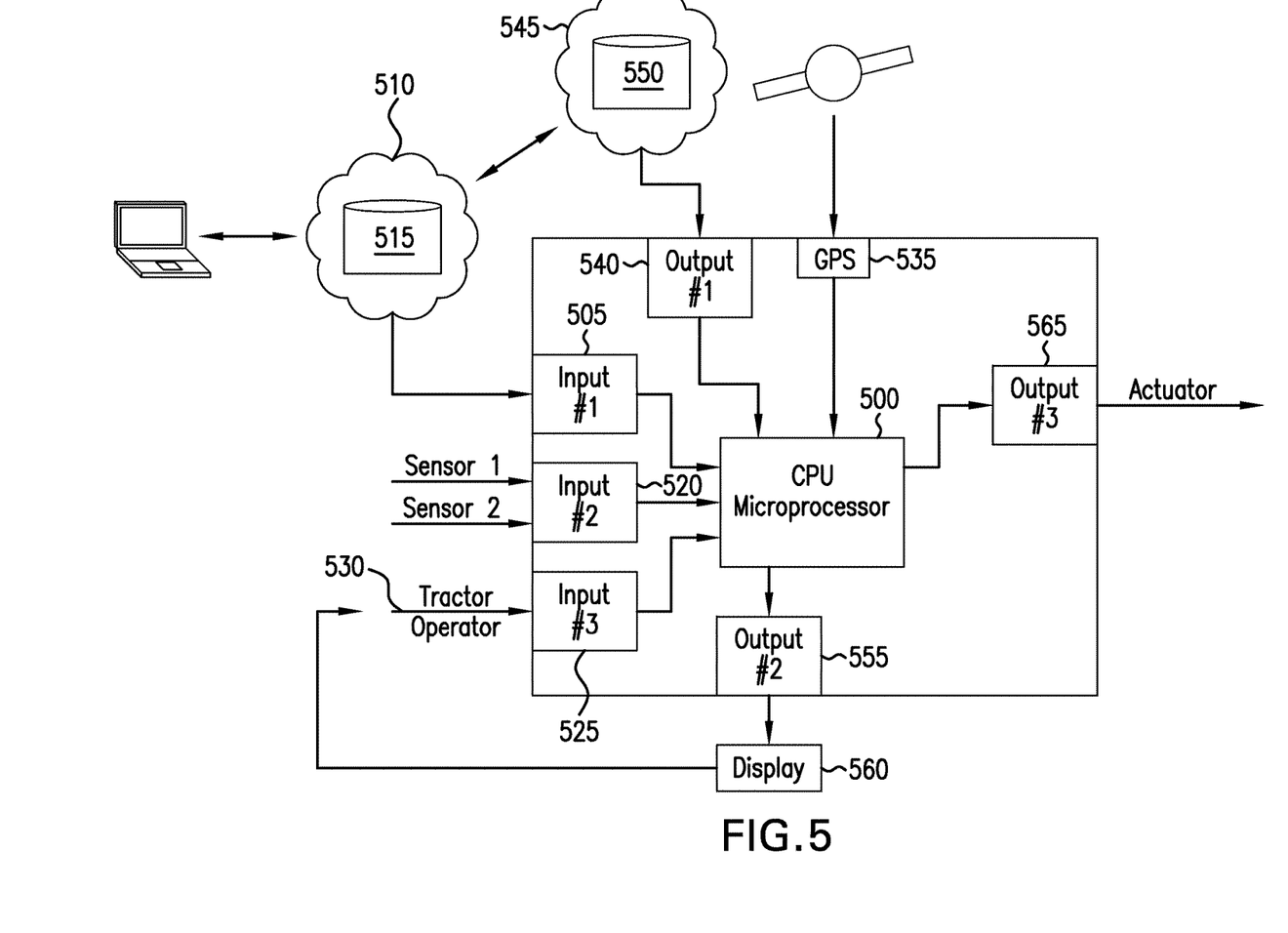
FIG. 5 depicts a block diagram illustrating exemplary input and output modules to the control system of the DASCS.

FIG. 5 depicts a block diagram illustrating exemplary input and output modules to the control system of the DASCS. A control system 170 contains a central processing unit (CPU) 500. The CPU 500 connects to a first input module 505. In the depicted embodiment, the first input module 505 receives soil condition information stored in a first database 515 from a wireless network 510. In some embodiments, the data from the wireless network 510 may originate from an operator at a remote location. The control system 170 includes a second input module 520 connected to the CPU 500. The second input module 520 transmits parameter sensor data to the CPU 500. In some embodiments, the parameter sensors may measure factors relating to soil condition of the field. For example, the parameter sensors may measure the level of residue coverage of the field surface 115. In some embodiments, the parameter sensors may be a micropower impulse radar (MIR) sensor. In some embodiments, the parameter sensors may measure different element values, for example, carbon or nitrogen, to be used in conjunction with GPS data to provide a highly valuable tillage map eliminating the need for an individual to collect soil samples.

A third input module 525 connects to the CPU 500. In the depicted embodiment, the third input module 525 transmits data received from a tractor 125 operator 530 to the CPU 500. The control system 170 contains a GPS module 535 to receive and transmit location coordinates. In some embodiments, the control system 170 may contain combination of input modules 505, 520, 525 and/or a GPS module 535. In some embodiments, the third input module 525 may be used by the tractor 125 operator 530 to make any adjustments to the lateral actuator 305, the yaw actuator 320, the lift actuator 425, or any combination thereof. For example, the tractor 125 operator 530 may override any adjustments made by the DASCS 155 based on sensory input 520 or predetermined input 505.

The control system 170 contains a first output module 540 connected to the CPU 500. In the depicted embodiment, the first output module 540 transmits collected data from the various input modules 505, 520, 525 and the GPS module 535 to a remote storage location 545. In some embodiments the remote storage location may be a second database 550. In some embodiments, the first database 515 and the second database 550 may be the same.

The control system 170 contains a second output module 555. In the depicted embodiment the second output module 555 transmits data to a monitor 560 for the tractor 125 operator 530 to review. For example, the monitor 560 may display information about the level of moisture of the field surface 100 for the tractor 125 operator 530 to enter instructions to the DASCS 155. The control system 170 contains a third output module 565 connected to the CPU 500. In an exemplary embodiment, the third output module 565 may transmit instructions to different actuator modules, for example, the lateral actuator 305.

Figure 6:
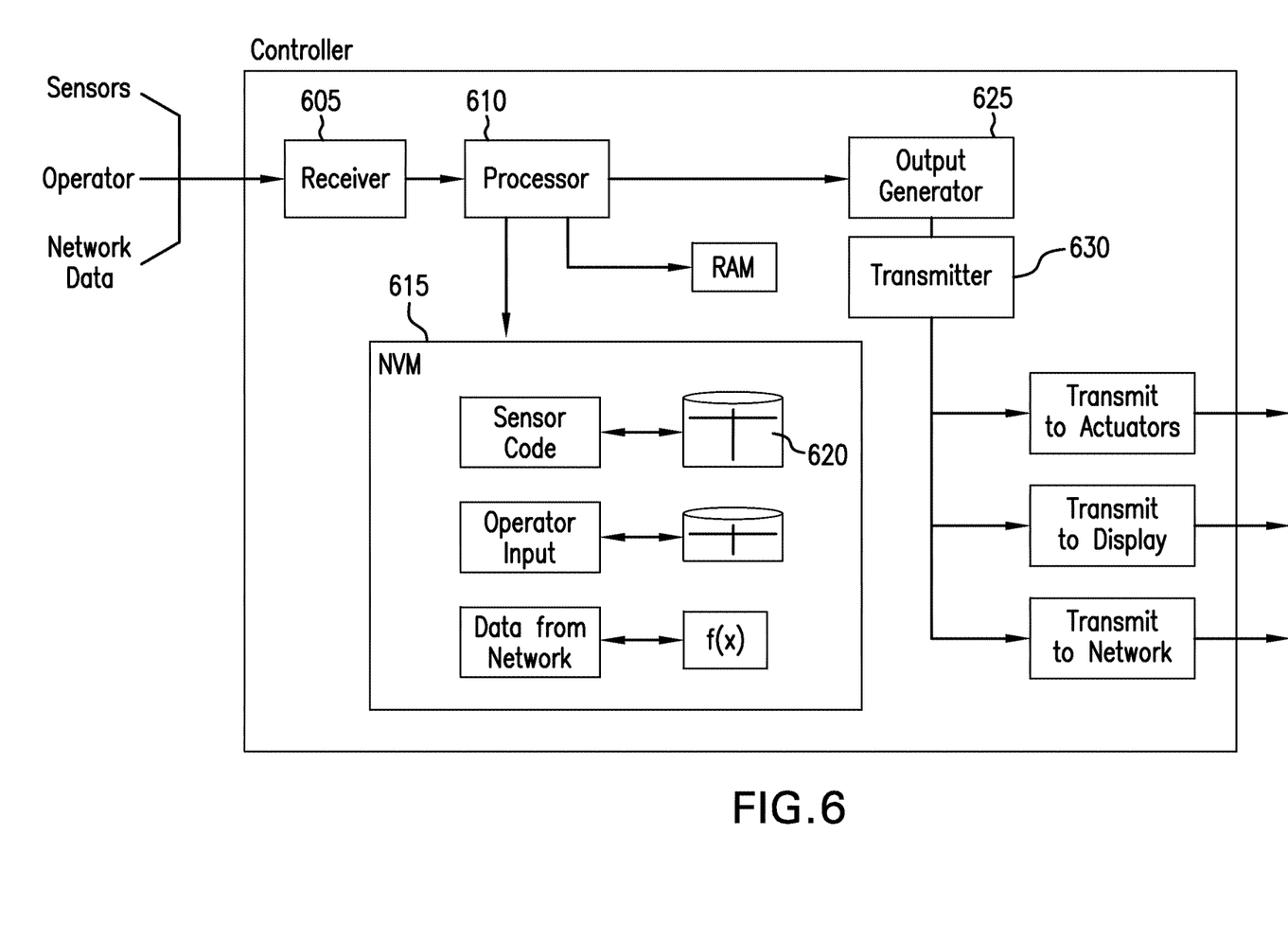
FIG. 6 is a block diagram of an exemplary DASCS controller.

FIG. 6 is a block diagram of an exemplary DASCS controller. In the depicted embodiment, the controller 600 includes a receiver 605 connected to the input modules 505 520 525. The receiver 605 transmits information from the input modules 505, 520, 525 to a processor 610. The processor 610 connects to a memory module 615. The memory module 615 includes a matrix 620 of commands and values corresponding to a variety of soil conditions. The processor 610 determines an output value by comparison of the information from the input modules 505, 520, 525 to the matrix 620 stored in the memory module 615. The processor 610 connects to an output generator 625. The output generator 625 receives the output value determined by the processor 610. The output generator 625 connects to a transmitter 630. The transmitter 630 sends information to the output modules 540, 555, 565.

Figure 7:
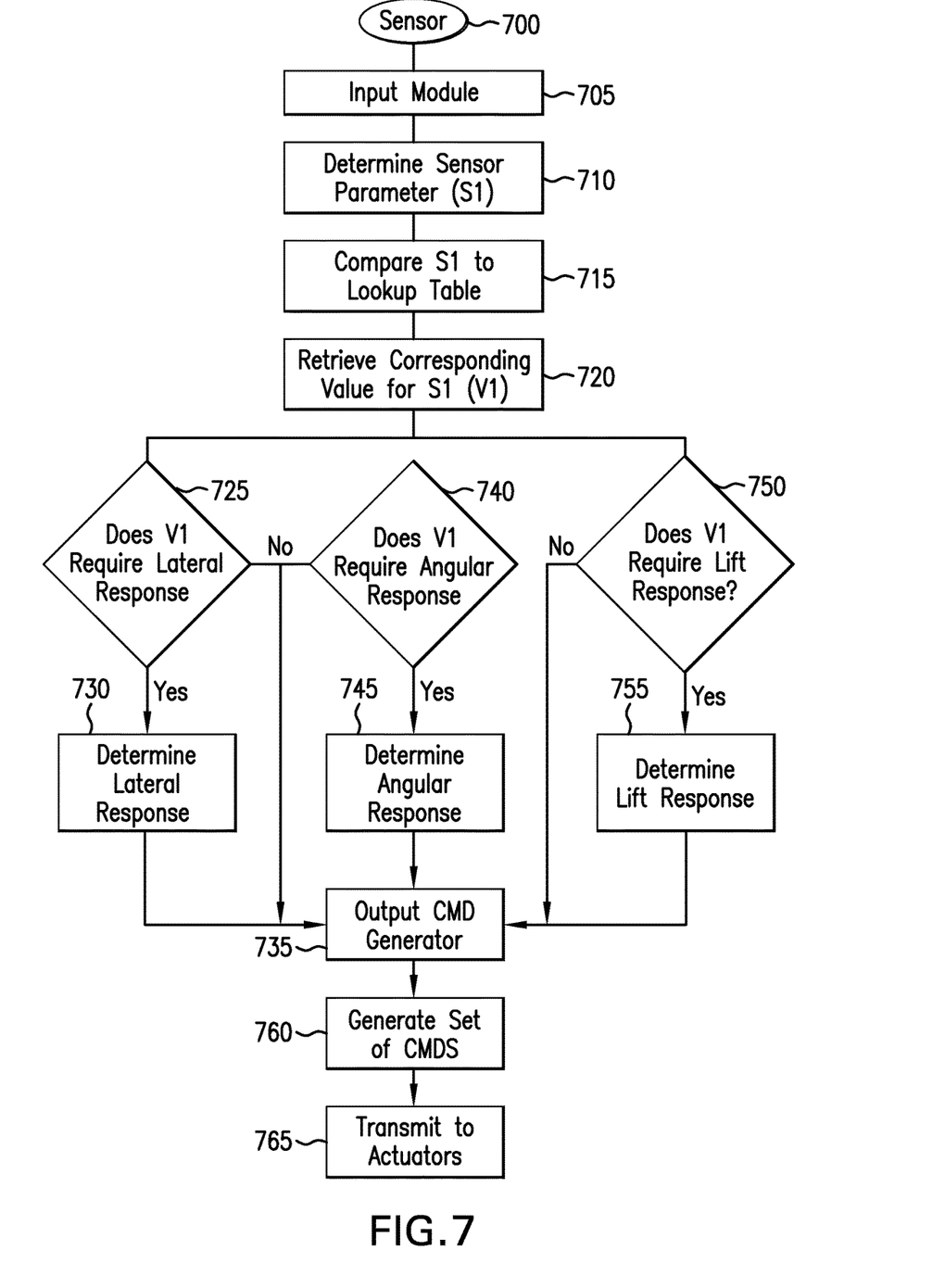
FIG. 7 is a flowchart illustrating exemplary operation of a control system with a singular sensor input module to an output command generator for a soil conditioning apparatus with a singular gang.

FIG. 7 is a flowchart illustrating exemplary operation of a control system with a singular sensor input module to an output command generator for a soil conditioning apparatus with a singular gang. As depicted, the sensor 700 connects to an input module 705. The input module 705 receives soil condition information from the sensor 700. The control system 170, at 710, processes the soil information to determine an associated value, for example, S1, with respect to the soil condition information. At 715, the control system 170 compares to value, S1, determined at 710 to a matrix 620 of commands and values relative to soil condition information. The control system 170 retrieves a corresponding value (e.g., V1), at 720, for the value (e.g., S1) from stage 710.

The control system 170, at 725, determines if the value (e.g., V1) from 720, requires a response to the lateral position of a gang. If the control system determines a lateral movement of a gang may be required 725 to optimize the cultivation of the soil, the control system 170 determines the optimal lateral shift 730 to the gang to optimize soil conditions. The control system 170 transmits the optimal lateral shift to the output command generator 735.

However, if at 725, the control system 170 determines no lateral movement of a gang is required to optimize the cultivation of the soil, then the method proceeds to 735.

The control system 170, at 740, determines if the value (e.g. V1) from 720, requires a response to the yaw position of a gang. If the control system 170 determines a yaw movement of a gang is required 740 to optimize the cultivation of the soil, then the control system 170 determines the optimal yaw shift 745 to the gang to optimize soil conditions. The control system 170 transmits the optimal yaw shift to the output command generator 735.

If, at 740, the control system 170 determines no yaw movement of a gang is required to optimize the cultivation of the soil, then the method proceeds to 735.

The control system 170, at 750, determines if the value (e.g. V1) from 720, requires a response to the position of a finishing attachment. If the control system 170 determines a modulation to lift the finishing attachment is required 750 to optimize the cultivation of the soil, then the control system 170 determines the optimal modulation to lift finishing attachment 755. The control system transmits the optimal modulation to lift the finishing attachment to the output command generator 735.

However, if at 750, the control system 170 determines no pressure change to the finishing attachment is required to optimize the cultivation of the soil, then the method proceeds to 735.

The output generator 735 generates set of commands 760 to transmit to actuator modules. For example, the set of commands may include commands to shift the gang laterally a determined amount, to do-nothing to the yaw, and to modulate the finishing attachment. In another example, the set of instructions may include commands to do-nothing to the gang laterally, to increase the shift to the yaw, and to do nothing to the finishing attachment. The set of commands may include various combination commands to the actuator modules.

Although various embodiments have been described with reference to the Figures, other embodiments are possible. For example, the DASCS 155 may include a global positioning system (GPS) receiver to receive GPS coordinates to determine the necessary adjustments to the actuator modules. In another embodiment, the DASCS 155 may store GPS information and soil condition information from the sensors in memory located in the control system. The information may be used to create a tillage map of the cultivated field. In some embodiments, the GPS information and the soil condition information may be transmitted via a wireless communication link to a database in a remote location where a third party may access it.

In some embodiments, a parameter data sensor may be configured to detect soil condition information proximate to a path of travel of the plurality of coulter disks. One or more such parameter data sensor(s) may be located in advance of the travel of the coulter disks, such as if mounted on the front of the tractor, for example. Such detection may be in substantially near real time. The controller may respond to received data from such parameter sensors and generate command signals to the actuators with a delay such that the coulter disk positions are manipulated to be optimized at the time the respective coulter disks make contact with the soil at the location where the data was taken. In some examples, the controller may receive or estimate information about a speed or velocity of the tractor. In some implementations, the controller may incorporate information about speed and velocity to determine timing of the commands issued to the actuator modules, with respect to the relative positions of the respective coulter disks from the position of the sensor.

Some aspects of embodiments may be implemented as a computer system. For example, various implementations may include digital and/or analog circuitry, computer hardware, other sensors (e.g., temperature sensors), firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer. For example, wearable devices or other technologies may facilitate input and/or output operations between a user and a system.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g/n, Wi-Fi, Bluetooth, BLE, ZigBee, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. An apparatus comprising:
   a lateral actuator module having a programmably positionable control member operable to position a control point at a predetermined position between two opposing, laterally-spaced end-of-travel positions;
   a first gang header that extends substantially laterally relative to a forward direction of travel along a longitudinal axis, the first gang header being mechanically connected to and laterally positioned by the control point; and
   a plurality of coulter disks laterally spaced apart from each other and supported by the first gang header;
   wherein the predetermined position is dynamically calculated according to a predetermined function and based on information about one or more conditions of the soil in contact with the first coulter disks.

2. The apparatus of claim 1, further comprising a mount attached to the first gang header, the mount comprising a pivot point defining a yaw axis.

3. The apparatus of claim 2, wherein the first gang header is rotatable about the yaw axis.

4. The apparatus of claim 1, further comprising a parameter data sensor configured to detect soil condition information proximate to a path of travel of the plurality of coulter disks.

5. The apparatus of claim 4, further comprising soil condition information referenced to near real-time information about a geographic location of the plurality of coulter disks.

6. The apparatus of claim 5, wherein the predetermined position is dynamically calculated is further based on soil condition information detected by the parameter data sensor.

7. The apparatus of claim 1, further comprising a global positioning system (GPS) system configured to determine near real-time geographical location information about an object disposed at a known location relative to the coulter disks.

8. The apparatus of claim 1, further comprising a second lateral actuator module having a programmably positionable control member operable to position a control point at a predetermined position between two opposing, laterally-spaced end-of-travel positions;
   a second gang header that extends substantially laterally relative to a forward direction of travel along a longitudinal axis, the second gang header being mechanically connected to and laterally positioned by the control point; and,
   a second plurality of coulter disks laterally spaced apart from each other and supported by the second gang header,
   wherein the second gang header is longitudinally spaced apart from the first gang header.

9. The apparatus of claim 8, wherein each of the second plurality of coulter disks is alignable to rotate about a lateral axis and lying in a plane substantially parallel to the longitudinal axis.

10. The apparatus of claim 9, further comprising a control system operatively coupled to receive soil condition information, to receive position information about the position of the coulter disks, and to generate a command signal for transmission to at least one of the lateral actuator modules, wherein the controller generates the command signals in response to the received soil condition information and according to the received position information.

11. The apparatus of claim 10, wherein the control system determines the relative lateral spacing between a selected one of the coulter disks in the second gang and a selected one of the coulter disks in the first gang, wherein the selected one of the coulter disks in the first gang travels a first disk path, and the selected one of the coulter disks in the second gang is selected from the coulter disks in the second gang that travels a path that is the closest adjacent path to the first path.

12. The apparatus of claim 1, further comprising a control system operatively coupled to receive soil condition information, to receive location information about the location of the coulter disks, and to generate a command signal for transmission to the lateral actuator module, wherein the controller generates the command signal in response to the received soil condition information and according to the received location information.

13. An apparatus comprising:
   a first lateral actuator module having a programmably positionable control member operable to position a first control point at a first predetermined position between a first set of two opposing, laterally-spaced end-of-travel positions;
   a first gang header that extends substantially laterally relative to a forward direction of travel along a longitudinal axis, the first gang header being mechanically connected to and laterally positioned by the first control point;
   a first plurality of coulter disks laterally spaced apart from each other and supported by the first gang header;
   a second lateral actuator module having a programmably positionable control member operable to position a second control point at a second predetermined position between a second set of two opposing, laterally-spaced end-of-travel positions;
   a second gang header that extends substantially laterally relative to the forward direction of travel along the longitudinal axis, the second gang header being mechanically connected to and laterally positioned by the second control point; and
   a second plurality of coulter disks laterally spaced apart from each other and supported by the second gang header, wherein the second gang header is longitudinally spaced apart from the first gang header; and,
   a control system operatively coupled to receive soil condition information, to receive location information about the location of the first or second plurality of coulter disks, and to generate a first command signal for transmission to the first lateral actuator module, wherein the controller generates the first command signal in response to the received soil condition information and according to the received location information,
   wherein the first predetermined position is dynamically calculated according to a predetermined function and based on information about one or more conditions of the soil in contact with the first coulter disks.

14. The apparatus of claim 13, wherein the control system is further operatively coupled to generate a second command signal for transmission to the second lateral actuator module, wherein the controller generates the second command signal in response to the received soil condition information and according to the received location information.

15. The apparatus of claim 13, wherein the second predetermined position is dynamically calculated according to a predetermined function and based on information about one or more conditions of the soil in contact with the second coulter disks.

16. An apparatus comprising:
   a lateral actuator module having a programmably positionable control member operable to position a control point at a predetermined position between two opposing, laterally-spaced end-of-travel positions;
   a first gang header that extends substantially laterally relative to a forward direction of travel along a longitudinal axis, the first gang header being mechanically connected to and laterally positioned by the control point;
   a plurality of coulter disks laterally spaced apart from each other and supported by the first gang header; and,
   means for receiving soil condition information,
   wherein the predetermined position is dynamically calculated according to a predetermined function and based on information about one or more condition of the soil in contact with the first coulter disks.

17. The apparatus of claim 16, further comprising means for receiving location information about the location of the first or second plurality of coulter disk.

18. The apparatus of claim 17, further comprising means for generating a command signal in response to the received soil condition information and according to the received location information.

19. The apparatus of claim 16, further comprising means for controlling a yaw angle of the first gang header with respect to the forward direction of travel along the longitudinal axis.

20. The apparatus of claim 16, wherein the yaw control means is responsive to information about the condition of the soil in contact with the first coulter disks.

* * * * *